United States Patent [19]

Jaeger

[11] Patent Number: 4,830,051

[45] Date of Patent: May 16, 1989

[54] ROTARY FILLING AND EMPTYING VALVE

[75] Inventor: John J. Jaeger, St. Charles, Mo.

[73] Assignee: The United States of America as represented by the Secretary of the Army, Fort Belvoir, Va.

[21] Appl. No.: 92,357

[22] Filed: Sep. 2, 1987

[51] Int. Cl.[4] .............................................. F16K 11/02

[52] U.S. Cl. .......................... 137/625.21; 137/625.46; 405/85; 405/99

[58] Field of Search ...................... 137/625.21, 625.46, 137/875, 876; 405/85, 99

[56] References Cited

U.S. PATENT DOCUMENTS

| | | | |
|---|---|---|---|
| 14,387 | 3/1856 | Butler | 137/236.1 X |
| 598,807 | 2/1898 | O'Donnell | 137/613 X |
| 1,178,208 | 4/1916 | Benbow et al. . | |
| 2,347,936 | 5/1944 | Crewson | 137/875 X |
| 2,551,678 | 5/1951 | Jermar . | |
| 2,643,640 | 6/1953 | Lear . | |
| 2,759,697 | 8/1956 | Harza . | |
| 3,011,522 | 12/1961 | Welsh | 137/625.46 |
| 3,069,861 | 12/1962 | Berke et al. . | |
| 3,738,197 | 6/1973 | Brumm et al. . | |
| 4,132,167 | 1/1979 | Ishii . | |

FOREIGN PATENT DOCUMENTS

| | | | |
|---|---|---|---|
| 2808211 | 8/1978 | Fed. Rep. of Germany | 137/625.46 |
| 59-9376 | 1/1984 | Japan | 137/625.21 |

*Primary Examiner*—Gerald A. Michalsky
*Attorney, Agent, or Firm*—Darrell E. Hollis

[57] ABSTRACT

A rotary valve assembly is disclosed for regulating the flow through two ports to control the filling and emptying of a lock. The valve assembly includes a plurality of planar elements, rotatable about a vertical axis within a cylindrical housing, and disposed at predefined angles as viewed in a horizontal plane, determined by the angles of intersection with the housing of a plurality of fluid conduits. Controlled rotation of the valve positions the planar elements relative to the fluid conduits, to direct flow from a source conduit into a lock chamber to fill it with water, to direct flow from the chamber to empty the lock, or to prevent flow altogether.

22 Claims, 3 Drawing Sheets

ROTARY FILLING AND EMPTYING VALVE

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

This invention relates generally to valves and to a valve for regulating flow through two port. More particularly, the invention relates to a single valve system for controlling fluid flow to fill and empty a lock chamber.

2. Related Art

Locks are commonly used in waterways to adjust the elevation of a vessel to match the different elevations of the waterway. These locks are frequently used to raise or lower a vessel in a navigable canal.

Heretofore, a minimum of two valves have been required to control the filling and emptying of the lock chamber: one valve located between the intake conduit and the chamber to release flow during the filling operation, and the other valve located between the chamber and the discharge manifold to discharge the flow during the emptying operation. The valves have generally been of the type which rotate about a horizontal axis.

This system results in significant initial-cost expenses associated with multiple operating machinery, culvert or conduit bulkheads, and extensive quantities of cement, concrete reinforcement, and foundation pilings to support the required additional machinery. Another disadvantage is the costs associated with providing and maintaining stone protection at the discharge end of the culvert to minimize erosion of the waterway bottom. A further disadvantage is that multiple operating machinery, located several hundred feet apart, must be maintained. Such system also requires extensive engineering time to analyze and design the required supporting structure for the multiple operating machinery.

Rotary valves are know which can control fluid flow through more than one port. Examples of three-way and four-way valves may be found in the following U.S. patents: U.S. Pat. No. 4,132,167, to Ishii; U.S. Pat. No. 2,643,640, to Lear; and U.S. Pat. No. 114,078, to Woods. In these valves, and other similar types, the fluid passages intersect at approximately 90°, and are used generally to control low-quantity fluid flow rates through small size conduits. Such valves are not designed for nor are they capable of handling the flow volumes and forces associated with controlling flow during the filling and emptying of a lock chamber or similar hydraulic applications.

U.S. Pat. No. 3,069,861, to Berke et al. discloses a three-way valve in a sluice dam seal but, again, the flow conduits intersect at 90° angles and the hydraulic forces encountered are relatively low. Harza, U.S. Pat. No. 2,759,697, discloses a butterflytype valve for hydraulic applications, such as controlling water discharge through the bottom of a dam, and Jermar, U.S. Pat. No. 2,551,678, discloses a valve for controlling the water level in a lock, sluice gate, or the like, which is operated solely by the hydrostatic pressure of different water levels. The valves of the latter two patents do not control water flow through more than one port.

SUMMARY OF THE INVENTION

Accordingly, among the objects of the present invention are: to provide a valve of the rotary type for controlling flow through more than one port; to provide a valve of the foregoing type in which the ports may be oriented at any angle between 0°–180° ; to provide a valve of the foregoing type uniquely adapted for the hydraulic forces encountered in controlling flow to and from a lock; to provide a single valve system to control flow during both the filling and emptying of a lock; to provide a valve system of the foregoing type which will reduce initial-cost expenses associated with a lock flow control system by eliminating the need for multiple operating machinery, which in turn will reduce the amount of construction materials required; to provide a valve system of the forgoing type which will eliminate the need for extensive stone protection on the river bottom by providing for the release of the discharge flow into the existing concrete dam stilling basin; and to provide a valve system of the foregoing type which will reduce maintenance costs by reducing required maintenance to one location.

These and other objects of the invention are attained in the present valve system in which a plurality of reinforced planar elements are disposed at predefined angles and rotatable about a vertical axis within a cylindrical housing to position selected elements as flow-directing surfaces through the housing, to direct flow from a source conduit to a lock chamber to fill the chamber, to direct flow from the chamber during emptying of the chamber, and to prevent flow completely. Two of the planar elements are disposed at predetermined angles relative to a third, diametric element.

A better understanding and appreciation of the foregoing description as well as other objects, features and advantages of the invention can be obtained from the following description of a presently-preferred embodiment, when considered in conjunction with the accompanying drawings.

DETAILED DESCRIPTION OF THE PREFERRED EMBODIMENT

In the following description the valve system of the invention is disclosed as used to control water flow in the filling and emptying of a lock chamber, customarily used in raising and lowering a vessel.

Figure 1:
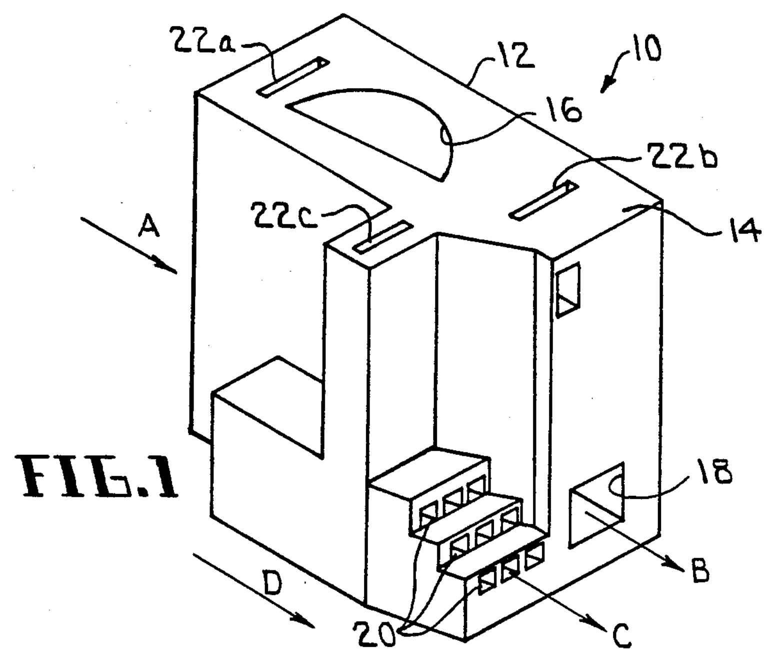
FIG. 1 is a perspective view showing a portion of the housing for the valve system of the present invention.

Referring now to the drawings, FIG. 1 shows a perspective view of a portion of one wall 10 of a lock chamber (FIG. 4), in which the valve assembly of the present invention is housed, and includes a wall 12 facing the lock chamber and an upper surface 14. Wall 10 is constructed of suitable material, such as reinforced concrete. Visible in the upper surface 14 is a substantially semi-circular opening 16 which extends downwardly into a well for receiving the valve assembly. Visible in one vertical surface of wall 10 is a port 18 in fluid communication with the lock chamber, and a plurality of ports 20 through which water is discharged to the spillway. Arrows A, B and C indicate, respectively, water flow from the intake conduit (not shown), flow to and from the lock chamber and flow to the discharge. Also visible in the upper surface 14 are rectangular-shaped openings or slots 22*a–c* for conventional gate valve bulkheads (not shown) regulating flow in the individual culverts conducting the flows indicated by the flow arrows A, B and C.

Figure 2:
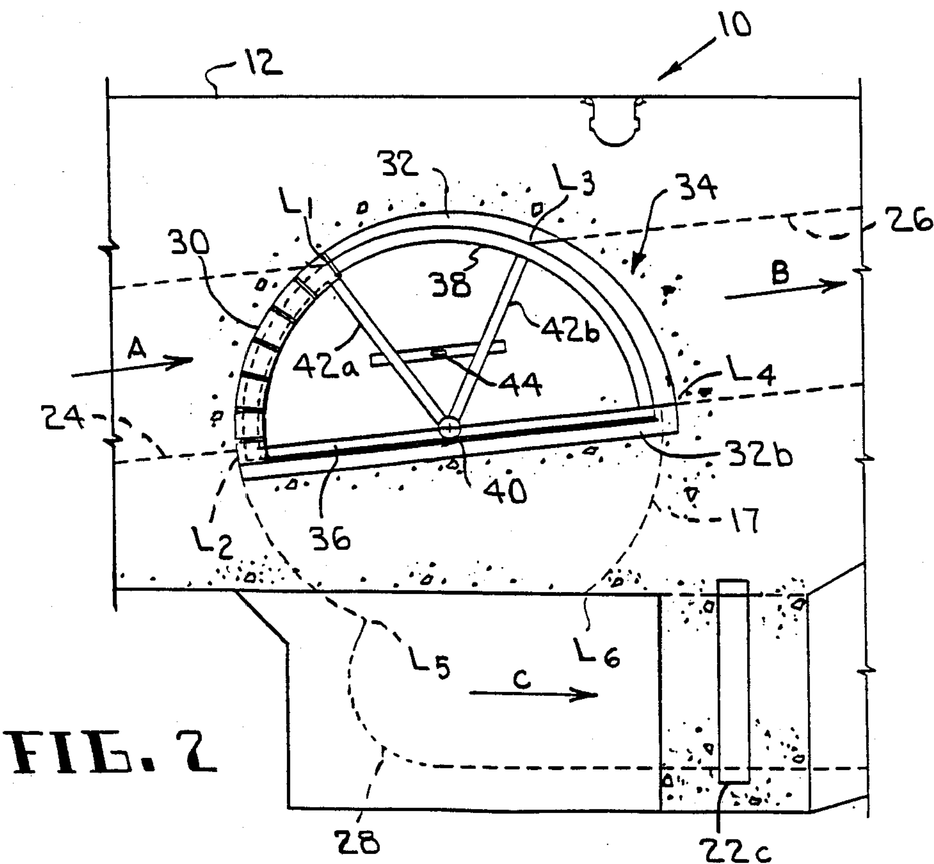
FIG. 2 is a cross-sectional view of the housing, as seen along line 2—2 in FIG. 1.

FIG. 2 is a cross section through wall 10, at approximately the level indicated by section line 2—2 in FIG. 1. When considered with FIG. 3, it can be seen that opening 16 extends downwardly into a well 17 which receives the valve structure, the well being substantially circular in cross-sectional configuration. An intake culvert 24 and a chamber culvert 26 intersect the periphery of well 17 on opposite sides, with culverts 24 and 26 being substantially co-linear. For convenience, the lines of intersection between the opposite, vertical walls of culvert 24 and the wall of well 17 are denoted as $L_1$ and $L_2$, and those between the opposite, vertical walls of culvert 26 and the well by $L_3$ and $L_4$. A discharge culvert 28 is also in fluid communication with well 17, intersecting the well at intersection lines $L_5$ and $L_6$, and is disposed at an angle with respect to culverts 24 and 26. A removable seal 30 is disposed adjacent to the intersection of culvert 24 with well 17. A curved linear section 32*a* is disposed around the wall of well 17, between the intersecting points of culverts 24 and 26 with the periphery of the well, and a straight liner section 32*b* is disposed along a diametric locus of well 17.

Valve assembly 34 includes a straight section 36 positionable substantially along a diameter of the circular well 17, and may comprise a single piece extending the width (diameter) of the well, or two radial pieces securely joined. A drive shaft 40 is rigidly joined to the mid-point of valve section 36, and flat, planar sections 42*a,b* are rigidly fixed to and extend radially from the drive shaft, each being disposed at approximately 60° angles relative to the center line of section 36. Valve assembly 34 is provided with a lifting device 44 by which the valve is lowered into the well 17 through the opening 16 in the top surface 14 of wall 10 (FIG. 1) by a crane or other suitable equipment.

Figure 4:
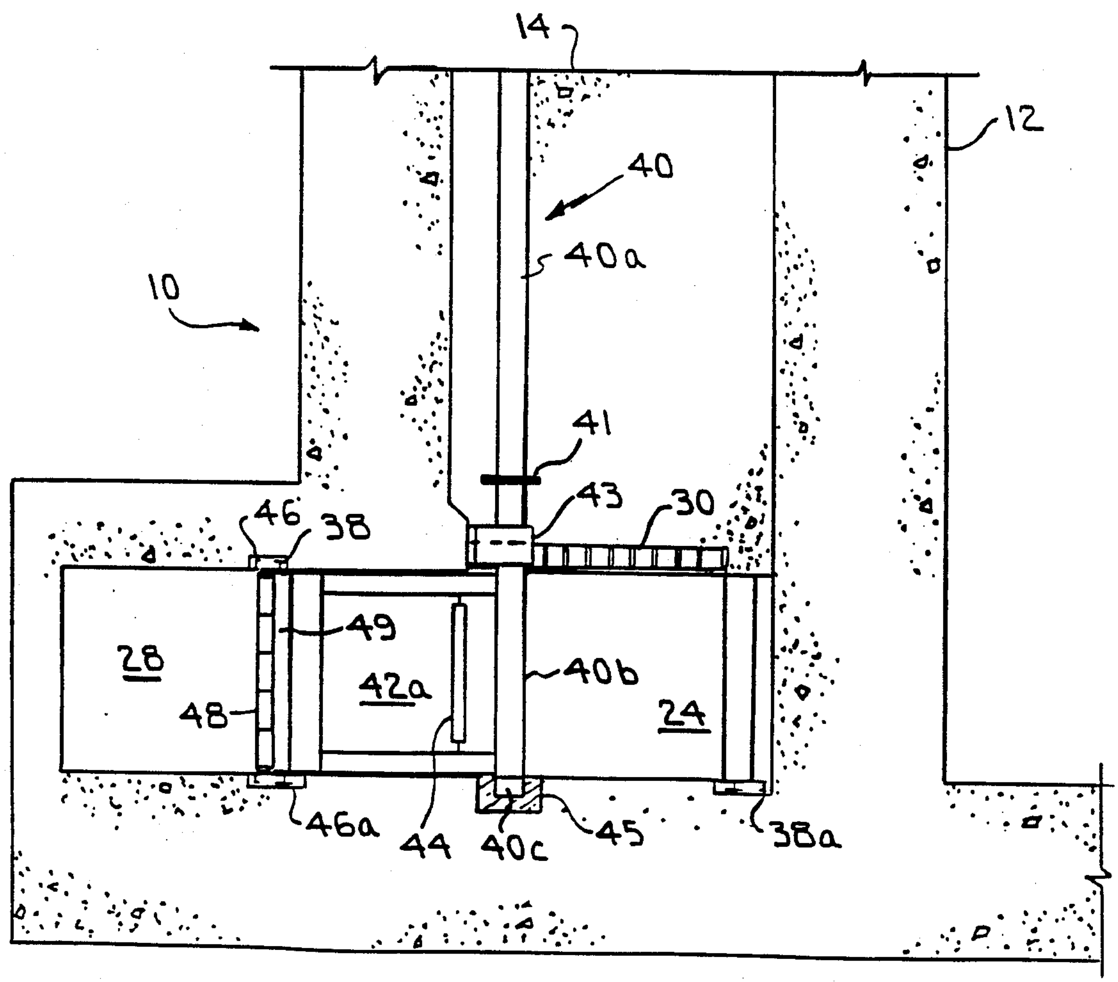
FIG. 4 is an elevation view of the valve system as shown in FIG. 3.
Figure 3:
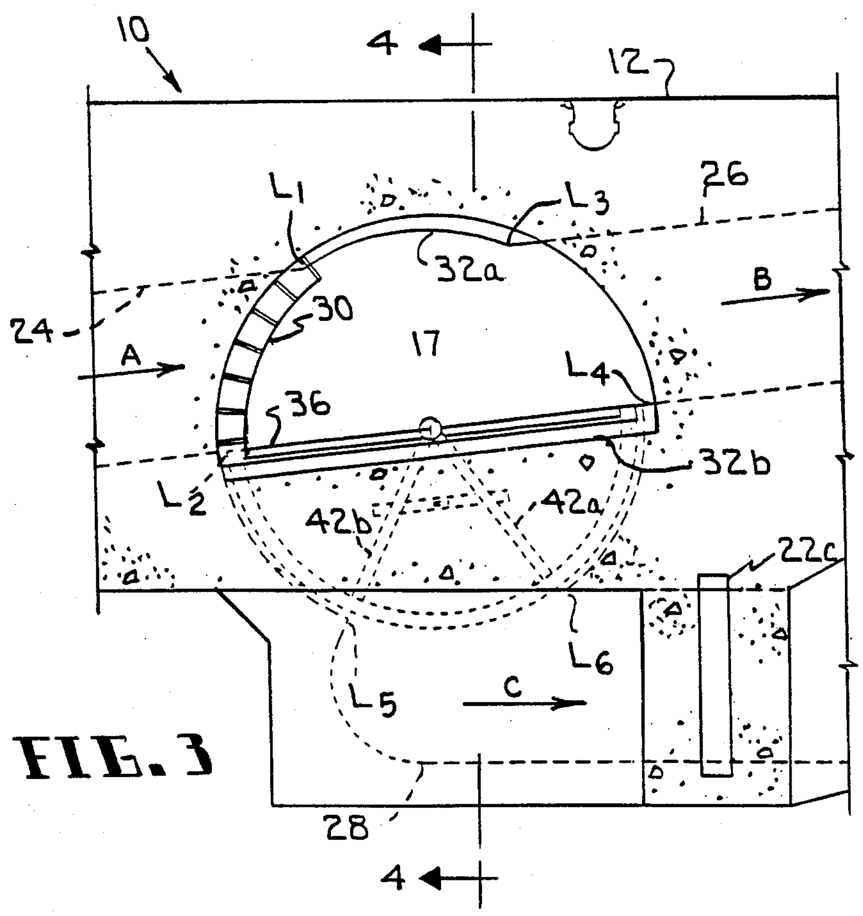
FIG. 3 is a view similar to FIG. 2, showing the valve system in position to permit filling of the lock chamber.

As can be seen in FIG. 4, which is an elevational cross-sectional view of wall 10 along sectional line 4—4 in FIG. 3, looking upstream through well 17, toward the intake culvert 24, the drive shaft 40 may comprise an upper section 40*a* and a lower section 40*b* joined by a shaft coupling 41 rotatably supported by a pillow block 43. The lower end of shaft section 40*b* is rotatably supported in a bearing assembly 40c disposed within a recessed bearing support 45. As also shown in FIG. 4, the planar elements forming the rotary valve assembly 34 have a height substantially equal to the height of the intake culvert 24 and discharge culvert 28, and are rigidly secured to the lower drive shaft portion 40*b*. Semi-circular upper and lower contact elements 38 and 38*a* are received within similarly-shaped channels or grooves 46 and 46*a*, respectively, recessed into the ceiling and floor of well 17, to provide rubbing surfaces for the replaceable resilient seals (not shown) attached to the top and bottom of valve assembly 34. Although not visible in FIG. 4, the lower edges of valve assembly 34 may be suitably supported by rollers or similar bearings to facilitate easy rotation thereof about the center line of the drive shaft 40. These rollers can be conveniently disposed so as also to be supported by 38a.

Replaceable resilient seals are provided along the vertical surface of the wall of well 17 at points $L_1$–$L_6$, such as seal 48 at point $L_5$. The seals are attached to the well wall to isolate any fluttering which may otherwise result if they were attached to the valve assembly 34 itself. Small plates, such as 49, extending from the vertical edges of valve sections 36 and 42*a,b* align with the seals on the well wall when valve assembly 34 is in the filling, emptying or discharge position, as described below, to depress the seals and prevent flow between the well wall and the sections of the valve assembly.

When properly positioned within well 17, valve assembly 34 has the configuration shown in FIG. 2, wherein the diametric section 36 is substantially aligned with one wall of culverts 24 and 26. Radially-extending elements 42*a,b* then are disposed at approximately 60° angles relative to the diametric portion 36. By way of example only, the culverts 24, 26 and 28 may be approximately sixteen feet (4.9 m) wide, with the valve-receiving well 17 having a diameter of approximately thirty-four feet (10.4 m).

Figure 6:
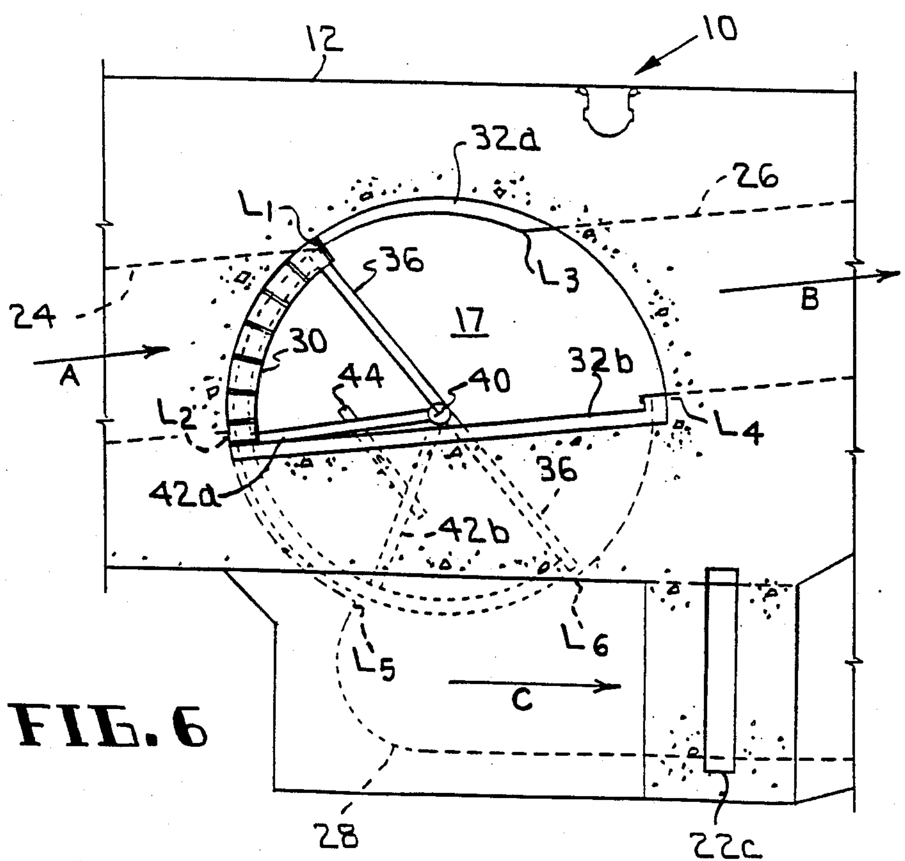

The idle, or no flow position is shown in FIG. 6, in which valve assembly 34 prevents all flow through the well 17. In this orientation, diametric portion 36 of the valve are positioned such that its opposite vertical edges contact points $L_1$ and $L_6$, which represent the intersections described above. Similarly, in this orientation, the free edges of radial elements 42*a,b* make contact, respectively, with the lines of intersection $L_2$ and $L_5$. Thus, flow through well 17 from the intake is prevented by radial element 42*a* and diametric section 36; flow from the chamber is prevented by the diametric section 36 contacting the lines of intersection $L_1$ and $L_6$; and flow to discharge culvert 28 is prevented by contact between radial element 42*b* with intersection line $l_5$ and between section 36 and intersection line $L_6$.

When it is desired to permit flow of water into the lock chamber 50, valve assembly 34 is rotated into the orientation shown in FIG. 3, wherein the diametric portion 36 is aligned with points $L_2$ and $L_4$ to form a flow path between intake culvert 24 and chamber culvert 26, and correspondingly blocks access to the discharge culvert 28. Water is then directed from the intake, through the intake culvert 24, through the well 17, and through the chamber culvert 26, for flow into the lock chamber 50. With the angular orientation of radial valve elements 42*a,b,* these elements further block fluid communication with discharge 28.

Figure 5:
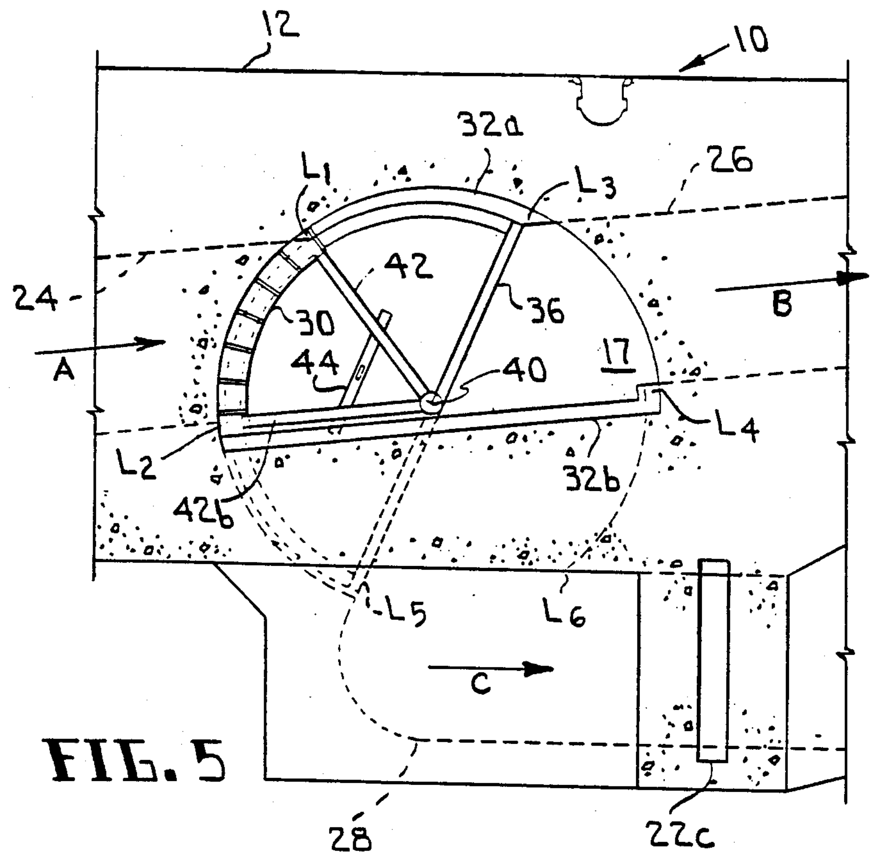
FIGS. 5 and 6 are plan views similar to FIG. 2, showing the position of the valve system in the discharge position to empty the lock chamber and in the idle position, respectively.

To empty lock chamber 50, rotary valve assembly 34 is rotated into the orientation shown in FIG. 5, wherein the diametric portion 36 of the valve joins the points $L_3$ and $L_5$. In this orientation, chamber culvert 26 and discharge culvert 28 are placed in fluid communication via well 17, with portion 36 of the valve forming a flow-directing surface. Also, as shown in FIG. 5, in the orientation for emptying the lock chamber, the angular position of the radial valve elements 42*a,b* are such that the vertical edges of these respective plates are disposed adjacent to points $L_1$ and $L_2$. Valve elements 42*a,b,* therefore, provide additional assurance to prevent flow from or into the culvert 24.

The operation of valve assembly 34 is apparent from the foregoing description. In the neutral position and without flow through the system, the valve assembly is positioned in the orientation as shown in FIG. 6. To permit flow through conduit 26 to fill the lock chamber 50, valve assembly 34 is rotated into the orientation shown in FIG. 3, with the water flowing from the intake, through the well 17 and through the chamber conduit 26. When the lock chamber 50 has been filled to the appropriate level, valve assembly 34 is operated to return the valve to the idle position shown in FIG. 6.

To empty the lock chamber 50, valve assembly 34 is operated to place it in the orientation shown in FIG. 5, to establish fluid communication between the chamber conduit 26 and the discharge conduit 28 via well 17, and to permit flow from lock chamber 50 into the discharge conduit and through discharge ports 20. It is also possible to operate the valve assembly to place the intake conduit 24 in fluid communication with the discharge conduit 28 if this is desired.

Rotation of valve assembly 34 may be by any suitable means (not shown). For example, a sector gear may be suitably coupled to the drive shaft 40, and rotational force applied to the gear by a motor driving through a speed reducer, or by a hydraulicallyoperated rack. The sector gear may be replaced by a ring gear. Similarly, rotation of the valve assembly may be achieved with a direct-acting hydraulic cylinder suitably coupled to the rotary valve, or a wire rope controlled by a powered sheave system. The action of a hydraulic cylinder may be transmitted to the drive shaft by an operating arm secured to the shaft. Control of the operation of the valve assembly is preferably automatic.

During the above-described operation of valve assembly 34, the gate valves in slots 22*a*–22*c* are raised to permit unobstructed flow through the respective culverts. Flow during the filling and emptying of the lock chamber is controlled solely by valve assembly 34. Use of gate valves in the culverts permits the removal of the valve assembly for repairs or replacement, or for the replacement of the edge seals while water is still in the culverts. Operation of the gate valves in the bulkhead slots is by any appropriate means.

The valve elements are preferably constructed as reinforced structures in which reinforcing frames are sandwiched between surface plates of steel or other suitable material. The thicknesses, heights, widths, etc., of the materials are suitably selected for the forces to which the valve assembly is subjected, which forces are transmitted to the supporting structure by the valve construction.

It is understood, of course, that the dimensional examples set forth above are for illustrative purposes only, and that the size of the valve assembly would be appropriately adjusted. Further, the angular orientation of the elements forming the valve assembly may be changed and adjusted to accommodate the configuration wherein the fluid conduits intersect the valve-receiving well at angles and orientation other than that illustratively described herein above. The valve assembly may be configured to effect fluid communication between two conduits oriented between 0°–80° relative to each other.

Although a preferred embodiment of the present invention has been described, it is to be understood that modifications and variations may be made by those skilled in the art without departing from the spirit of the invention, and such modifications and variations are considered to be within the purview and scope of the invention as defined by the appended claims.

What I claim is:

1. A rotary valve for controlling fluid flow between at least three valve ports, comprising:
   a. a substantially cylindrical housing having at least three ports;
   b. a plurality of planar valve elements disposed for rotation about a vertical axis within said housing, at least one of said elements being disposed along a diametric locus of said housing and at least two elements being disposed along a radius locus of said housing and being oriented at predetermined angles with respect to each other and said diametrically-disposed element, as viewed in a horizontal plane, said angles being determined by the angles of intersection of said ports with said housing; and
   c. means for rotating said valve elements to position selected ones relative to said ports, said elements forming flow-directing surfaces to selectively provide a flow path through said housing between two selected ports.

2. The valve as defined in claim 1, wherein said valve elements are disposed at an angle of 0°–180° with respect to each other.

3. The valve as defined in claim 2, wherein said valve elements are disposed at an angle of 60° with respect to each other.

4. The valve as defined in claim 1, wherein said means for rotating said valve elements comprises:
   a drive shaft rotatably disposed along the central vertical axis of said housing; and
   means for rotating said shaft about said axis,
   each of said planar valve elements being fixed to said shaft along a vertical edge and disposed at substantially 60° angles relative to each other.

5. The valve as defined in claim 4, further comprising:
   a. an intake conduit for coupling a fluid source to a first port;
   b. a first conduit for coupling a second port to a fluid containment chamber;
   c. a second conduit for coupling a third port to a discharge passage;
   d. intake flow control means located within said intake conduit for selectively controlling the fluid flow through said intake conduit;
   e. first flow control means located within said first conduit for selectively controlling the fluid flow through said first conduit; and
   f. second flow control means located within said second conduit for selectively controlling the fluid flow through said second conduit.

6. The valve as defined in claim 5, wherein said fluid containment chamber comprises a lock chamber and said valve assembly regulates fluid flow to said chamber, to control the filling and emptying of said chamber.

7. The valve of claim 5, further comprising means for installing and removing said rotary valve from said housing.

8. The valve of claim 5, further comprising replaceable sealing means disposed within said housing and associated with said planar elements, said rotary valve being removable for replacement of said sealing means or for repair while said flow control means restricts the fluid flow through said conduits.

9. The apparatus of claim 1 wherein said predetermined angles are less than ninety degrees.

10. In combination with a lock chamber for holding a quantity of water, an intake conduit coupled to a water source, a chamber conduit coupled to said lock chamber, and a discharge conduit coupled to a discharge passage, a rotary valve for controlling water flow between said intake conduit, said chamber conduit, and said discharge conduit to regulate the filling and emptying of said lock chamber, said rotary valve comprising:

a. a substantially cylindrical housing having an inlet port and first and second ports coupled, respectively, to said intake, said chamber, and said discharge conduits, said ports intersecting with said housing at predetermined angles;

b. a plurality of planar valve elements disposed for rotation about a vertical axis within said housing, at least one of said elements being disposed along a diametric locus of said housing and at least two elements being disposed along a radius locus of said housing and being oriented at predetermined angles with respect to each other and said diametrically-disposed element, as viewed in a horizontal plane, said angles being determined by the angles of intersection of said ports with said housing; and c. means for rotating said valve elements to position selected ones relative to said ports, said elements forming flow-directing surfaces to selectively provide a flow path through said housing between two selected ports.

11. The combination as defined in claim 10, wherein said means for rotating said valve elements comprises:

a drive shaft rotatably disposed along the central vertical axis of said housing; and means for rotating said shaft about said axis, each of said planar valve elements being fixed to said shaft along a vertical edge and disposed at an angle relative to each other of 0°-180°.

12. The combination as defined in claim 11, wherein said planar valve elements are disposed at substantially 60° relative to each other.

13. The combination as defined in claim 11, wherein each of said intake, chamber and discharge conduits has flow control means therein to selectively control the flow of water therethrough.

14. The combination as defined in claim 13, further comprising means for installing and removing said rotary valve assembly from said housing.

15. The combination as defined in claim 14, further comprising replaceable sealing means disposed within said housing and associated with said planar elements, said rotary valve being removable for replacement of said sealing means or for repair while said flow control means restricts the fluid flow through said conduits.

16. A rotary valve for controlling fluid flow between at least three valve ports, comprising:

a. a substantially cylindrical housing having at least three ports;

b. a plurality of planar valve elements disposed for rotation about a vertical axis within said housing, at least one of said elements being disposed along a diametric locus of said housing and at least two elements being disposed along at least two radius locus of said housing and being oriented at angles of less than ninety degrees with respect to each other and said diametrically-disposed element, as viewed in a horizontal plane, said angles being determined by the angles of intersection of said ports with said housing; and c. means for rotating said valve elements to position selected ones relative to said ports, said elements forming flowdirecting surfaces to selectively provide a flow path through said housing between two selected ports.

17. The valve of claim 16 wherein said planar elements are disposed at an angle of sixty degrees with respect to each other.

18. The valve of claim 16 wherein said means for rotating said planar elements comprise:

a. a drive shaft rotatably disposed along the central vertical axis of said housing; and b. means for rotating said shaft about said axis, each said planar valve element being fixed to said shaft along a vertical edge and disposed at substantially sixty degree angles relative to each other.

19. The valve of claim 18, further comprising:

a. an intake conduit for coupling a fluid source to a first port;

b. a first conduit for coupling a second port to a fluid containment chamber;

c. a second conduit for coupling a third port to a discharge passage;

d. intake flow control means located within said intake conduit for selectively controlling the fluid flow through said intake conduit;

e. first flow control means located within said first conduit for selectively controlling the fluid flow through said first conduit; and f. second flow control means located within said second conduit for selectively controlling the fluid flow through said second conduit.

20. The valve of claim 19 further comprising means for installing and removing said rotary valve assembly from said housing.

21. The combination as defined in claim 20, further comprising replaceable sealing means disposed within said housing and associated with said planar elements, said rotary valve being removable for replacement of said sealing means or for repair while said flow control means restricts the fluid flow through said conduits.

22. The valve of claim 19, wherein said fluid containment chamber comprises a lock chamber and said valve regulates fluid flow to said chamber thereby controlling the filling and emptying of said chamber.

* * * * *